United States Patent [19]
Onuma et al.

[11] Patent Number: 5,691,867
[45] Date of Patent: Nov. 25, 1997

[54] COMPLEX TYPE THIN FILM MAGNETIC HEAD AND PRODUCTION METHOD THEREOF

[75] Inventors: Hiroshi Onuma; Kazunori Onuma; Takashi Tamura, all of Miyagi, Japan

[73] Assignee: Sony Corporation, Tokyo, Japan

[21] Appl. No.: 674,796

[22] Filed: Jul. 3, 1996

[30] Foreign Application Priority Data

Jul. 5, 1995 [JP] Japan ................ 7-170017

[51] Int. Cl.[6] ............................................. G11B 5/39
[52] U.S. Cl. ................................... 360/126; 360/113
[58] Field of Search ......................... 360/126, 113

[56] References Cited

U.S. PATENT DOCUMENTS

| | | | |
|---|---|---|---|
| 5,493,464 | 2/1996 | Koshikawa | 360/126 X |
| 5,530,609 | 6/1996 | Koga et al. | 360/113 X |
| 5,555,147 | 9/1996 | Maruyama | 360/113 |
| 5,606,478 | 2/1997 | Chen et al. | 360/126 |
| 5,621,592 | 4/1997 | Gill et al. | 360/113 |
| 5,621,596 | 4/1997 | Santini | 360/126 |

*Primary Examiner*—John H. Wolff
*Attorney, Agent, or Firm*—Hill, Steadman & Simpson

[57] ABSTRACT

The present invention intends to solve the above described problems and provides a high reliability complex type thin film magnetic head in which high recording magnetic field density is achieved without deteriorating an MR element by heat, and in the case when the complex type thin film magnetic head is of sliding type, eccentric friction likely to occur in a lower magnetic core and a upper magnetic core is relaxed and production method thereof. The complex type thin film magnetic head is structured by forming an MR head portion on an inductive head portion produced on a base substrate. Conductive coils are formed on the recess portions formed on the lower magnetic core because the groove portions exist through a first flattening layer.

8 Claims, 8 Drawing Sheets

COMPLEX TYPE THIN FILM MAGNETIC HEAD AND PRODUCTION METHOD THEREOF

BACKGROUND OF THE INVENTION

1. Field of the Invention

The present invention relates to a complex type thin film magnetic head comprising an inductive magnetic head portion for recording provided with a conductive coil made of thin film, and a magnetic resistance effect type magnetic head portion for reproduction provided with a magnetic resistance effect element and production method thereof.

2. Description of Prior Art

Generally, there are thin film magnetic heads in which thin films such as magnetic layers and insulation layers are formed in multi-layers and further conductive coils or lead wires or the like are formed. Because this thin film magnetic head is formed by vacuum thin film formation technology, it has such features that fine sizing such as narrowing of tracks or gaps is easy and high resolution recording is possible. The thin film magnetic head attracts public attention as a magnetic head meeting a market demand for high density recording.

For example, as a thin film magnetic head of the type which faces a magnetic recording medium to record and reproduce information signals, there is a so-called complex type thin film magnetic head comprising a magnetic resistance effect magnetic head portion for reproduction in which a magnetic resistance effect element is held between a upper magnetic layer and a lower magnetic layer and an inductive magnetic head portion for recording in which conductive coils in the shape of spiral are formed on the upper magnetic layer serving as a lower magnetic core at the same time, through a flattening layer and a upper magnetic core is formed thereon, the magnetic resistance effect magnetic head portion and the inductive magnetic head portion being formed successively in the shape of layers by vacuum thin film formation technology.

Figure 1:
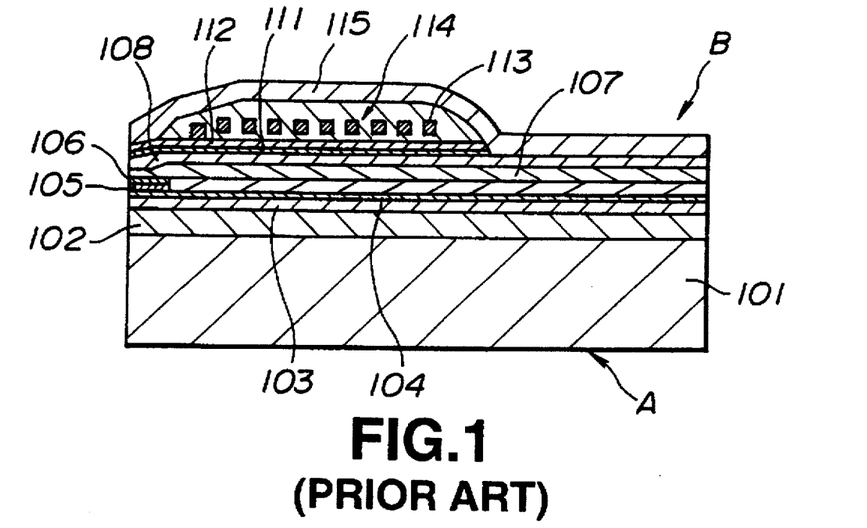
FIG. 1 is a vertical sectional view showing schematically a conventional complex type thin film magnetic head.

Concretely, the complex type thin film magnetic head is formed in a manner that an inductive magnetic head portion B is formed on a magnetic resistance effect magnetic head portion (MR head portion) A as shown in FIG. 1.

In the MR head portion A, soft magnetic film which serves as a lower magnetic layer 103 is formed on a non-magnetic substrate 101 through an insulation layer 102 and successively an insulation layer 104 made of $Al_2O_3$ or $SiO_2$ is formed thereon. On this insulation layer 104, a magnetic resistance effect element (MR element) is disposed so that its long side direction is substantially parallel to its magnetic recording medium facing surface (magnetic recording medium running surface) a and one end along the long side direction is exposed to the magnetic recording medium running face a.

Further, on both ends of the MR element 105, a pair of leading electrodes (not shown) for supplying sense current to the MR element 105 is disposed, and on this MR element, a bias conductor 106 facing the MR element 105 to supply bias current to the MR element 101 is disposed.

Still further, an insulation layer 107 made of $Al_2O_3$ or $SiO_2$ is formed on the bias conductor 106 and soft magnetic film serving as a upper magnetic layer 108 is formed on the insulation layer 107. The above mentioned MR head is composed in this manner.

In the inductive head portion B, gap film ill for forming magnetic gap on the upper magnetic layer 108 serving as the lower magnetic core at the same time is formed. Further, on this gap film 111, a first flattening layer 112 for flattening the surface thereof to facilitate formation of a conductive coil 113 is formed and still further, conductive coils 113 are formed in the shape of spiral on the surface of the flattening layer 112. Then, to flatten the surface of the conductive coils 113, a second flattening layer 114 made of polymeric material such as resist is formed and a upper magnetic core which is soft magnetic substance layer is formed on this second flattening layer 114. As a result, the above mentioned inductive head portion B is configured in this manner.

Currently, particularly in the complex type thin film magnetic head to be mounted in a data recorder (mainly for backup) using a magnetic tape as its recording medium, it has been proposed that metallic magnetic film having high magnetic permeability and high saturated magnetic flux density, such as Fe—Al base alloy, Fe—Co base alloy, and Co—Zr base amorphous alloy is used as material for the lower magnetic core 103 and the upper magnetic core 115 of the inductive head portion B. In the MR head portion, instead of the MR element 105, multiple-layer elements exerting great magnetic resistance effect have been used. In this multiple-layer element, a magnetic layer made of strong magnetic material and a conductive layer made of non-magnetic material having conductivity are formed alternately in the thickness of several atoms to form a plurality of these layers, so that the upmost and bottommost layers serve as magnetic layers.

Generally, problems which may occur in this case are relation between heat treatment temperature necessary for metallic magnetic film having high saturated magnetic flux density to obtain soft magnetic property and heat resistance of the first and second flattening layers 112, 114 made of resist or the like, and heat resistance of the MR element 105 itself.

For example, generally, it is well known that heat resistance of the MR element (particularly the above mentioned multi-layer element) is poor. As a problem which may occur when the above complex type thin film magnetic head is produced, because the inductive head portion B is produced after the MR head portion A is produced, if metallic magnetic film having high saturated magnetic flux density is used for the material of the lower magnetic core 103 and the upper magnetic core 115, heat treatment temperature necessary for obtaining soft magnetic property of this metallic magnetic film may exceed the heat resistance temperature of the MR element 105 or the above heat treatment temperature may exceed the heat resistance temperatures of the first and second flattening layers 112, 114.

Further, when the complex type thin film magnetic head is a sliding type complex type thin film magnetic head to be mounted on a computer data corder (mainly for backup) using a magnetic tape as its recording medium, its magnetic recording medium running face contacts the magnetic tape so that the magnetic tape slides along the running face, unlike heads mounted on hard disks. Thus, friction and eccentric friction which may occur on the lower magnetic core and the upper magnetic core, both made of the above mentioned metallic magnetic film become problems.

For example, when the lower magnetic core 103 and the upper magnetic core 115 made of metallic magnetic film which is conventional Parmalloy plating film are disposed on the sliding type complex type thin film magnetic head, the frictional amount of the lower magnetic core 103 and the upper magnetic core 115 against a magnetic tape is especially larger than the frictional amount of the substrate and the like. Thus, these portions are worn more quickly than the other portions such as the substrate 101 so as to produce indentations, that is, so-called eccentric friction occurs. Due to occurrence of this eccentric friction, spacing occurs between the head and the magnetic tape. Thus, magnetic field intensity of the magnetic gap with respect to the magnetic tape weakens, so that the electromagnetic transducing property in particularly high frequency region decreases.

Currently, the complex type thin film magnetic head has a problem in terms of production, relating to heat resistance of the MR element to be mounted on the MR head, and a problem in terms of usage, relating to friction (eccentric friction) which may occur on the lower magnetic core and the upper magnetic core made of metallic magnetic film, this problem being a problem inherent of the sliding type complex type thin film magnetic head. Resolution methods for both have been being researched.

SUMMARY OF THE INVENTION

Therefore, objects of the present invention are to solve the above described problems and provide a high reliability complex type thin film magnetic head in which high recording magnetic field density is achieved without deteriorating the MR element by heat and in the case when the complex type thin film magnetic head is of sliding type, eccentric friction likely to occur in the lower magnetic core and the upper magnetic core is relaxed, and production method thereof.

More particularly, objects of the present invention are a complex type thin film magnetic head comprising an inductive magnetic head portion for recording, containing conductive coils made of thin film and a magnetic resistance effect type magnetic head portion for reproduction containing magnetic resistance effect elements, and production method thereof.

The complex type thin film magnetic head according to the present invention comprises; an induced type magnetic head portion containing; a lower magnetic core made of soft magnetic-material, having recess portions provided on the top surface of a substrate made of non-magnetic material; conductive coils in the shape of spiral, formed on the recess portions disposed on the lower magnetic core through a flattening layer made of insulation material, the conductive coils being embedded in the recess portions and; a upper magnetic core made of soft magnetic material, formed on the conductive coils through the flattening layer made of insulation material; and a magnetic resistance effect type magnetic head portion containing; magnetic resistance effect elements formed on the upper magnetic core serving as the lower magnetic layer at the same time through an insulation layer and; a upper magnetic layer formed on the magnetic resistance effect element through an insulation layer.

When the above mentioned complex type thin film magnetic head is produced, first, the inductive magnetic head portion is produced successively through a process in which the lower magnetic core made of soft magnetic material, having recess portions on the top surface thereof is formed on the substrate made of non-magnetic material, a process in which the conductive coil in the shape of spiral is formed on the recess portion through the flattening layer made of insulation material, and a process in which the upper magnetic core made of soft magnetic material is formed on the conductive coil through the flattening layer made of insulation material. After that, this complex type thin film magnetic head is produced successively through a process in which the magnetic resistance effect element is formed on the above mentioned upper magnetic core simultaneously serving as the lower magnetic layer through the insulation layer and a process in which the upper magnetic layer is formed on the magnetic resistance effect element through the insulation layer.

Concretely, it is preferable that the insulation layer having groove portions thereon is formed between the substrate and the lower magnetic core and that the conductive coils are formed on the recess portions formed on the top surface of the lower magnetic core because the groove portions exist in the insulation layer, through the flattening layer.

Further, it is preferable that the lower magnetic core and the upper magnetic core are formed of metallic magnetic film having high magnetic permeability and high saturated magnetic flux density, more particularly, metallic magnetic film made of Fe—Ru—Ga—Si alloy or amorphous alloy. For the lower magnetic core and the upper magnetic core, metallic magnetic film in which heating temperature of heat treatment conducted to obtain soft magnetic property is higher than the deterioration temperature of the magnetic resistance effect element may be used.

Still further, it is preferable that the above substrate is formed of non-magnetic material in which CaO, $TiO_2$, and NiO are its main components, the mixing ratio between CaO and $TiO_2$ is 30/70–50/50 and the amount of the content of NiO is 5–30 mol %.

Yet still further, it is preferable that a protective plate is disposed on the upper magnetic layer and that the protective plate is formed of non-magnetic material in which CaO, $TiO_2$, and NiO are its main components, the mixing ratio between CaO and $TiO_2$ is 30/70–50/50 and the amount of the content of NiO is 5–30 mol %.

If the mixing ratio of CaO relative to $TiO_2$ is lower than 30/70, the separating amount of $TiO_2$ is large. And the thermal expansion efficient decreases to less than $100 \times 10^{-7}$ so that matching with the respective magnetic layers is deteriorated. On the other hand, if the mixing ratio between CaO and $TiO_2$ is higher than 50/50, CaO is separated so that sintering property is remarkably deteriorated, therefore it is difficult to achieve denseness.

As described above, in the complex type thin film magnetic head according to the present invention, because the MR head portion is formed on the inductive type head portion, even if heating temperature of heat treatment to be conducted to obtain soft magnetic property of the lower magnetic core and the upper magnetic core is higher than the deterioration temperature of the MR element in a process in which the inductive type head portion is produced, the MR element is never affected. Therefore, it is possible to provide the lower magnetic core and the upper magnetic core made of metallic magnetic film having high magnetic permeability and high saturated magnetic flux density without deteriorating the MR element by heat.

Further, because the recess portion exists on the top surface of the lower magnetic core and the conductive coil is formed on the recess portion in the state that it is embedded in the recess portion, it is possible to reduce the volume of the upper magnetic core when the upper magnetic core is formed. Further, the bottom surface of the MR head portion Q can be flattened easily thereby suppressing deterioration of magnetic property.

Still further, because the base substrate is composed of non-magnetic material in which CaO, $TiO_2$ and NiO are main components thereof, the mixing ratio between CaO and $TiO_2$ is 30/70–50/50 and the content of NiO is 5–30 mol, the frictional amount produced by repeating slide on the magnetic tape is substantially equalized throughout the magnetic recording medium running face while high frictional resistance is maintained, thereby preventing eccentric friction.

DESCRIPTION OF THE PREFERRED EMBODIMENTS

Hereinafter, the present invention will be described about several embodiments applicable to a complex type thin film magnetic head in which an MR head portion for reproduction is formed in the shape of layer on an inductive head portion preferable as a thin film magnetic head for recording, with reference to attached drawings.

As shown in FIG. 1, this complex type thin film magnetic head comprises inductive head portion P formed on a base substrate made of non-magnetic material such as $Al_2O_3$—TiC through an insulation layer 2 made of $Al_2O_3$ in a state that conductive coils 4 are held between a lower magnetic core 3 and a upper magnetic core 9, MR head portion Q formed in a state that an MR element 11 producing magnetic resistance effect is held between the upper magnetic core 9 serving as a lower magnetic layer and a upper magnetic layer 13, which are both soft magnetic material, the MR head portion being formed on the inductive head portion P, and a protective plate made of non-magnetic material formed on the upper magnetic layer 13.

In the inductive head portion P, a first flattening layer 23 made of polymeric material such as resist is formed on the lower magnetic core 2 made of Fe—Ru—Ga—Si alloy which becomes soft magnetic layer when it is subject to heat treatment so as to flatten the surface of the lower magnetic core 2 in order to facilitate formation of the conductive coil 4. The conductive coil 4 is formed thereon in the form of a spiral.

Groove portions 2a are made on the insulation layer 2 formed on the base substrate 1. Because this groove portion 2a exists, conductive coils 4 are formed within the groove portions 2a, on recess portions 3a formed on the lower magnetic core 3 through the first flattening layer 23.

Then, to flatten the surface of the lower magnetic core 3, a second flattening layer 6 made of polymeric material such as resist is formed so as to fill gaps between the conductive coils 4, thereby the surface of the lower magnetic core 3 being flattened. The upper magnetic core 9 made of Fe—Ru—Ga—Si alloy is formed on the second flattening layer 6 through gap film forming magnetic gap for recording and a foundation layer 21 which serves as a flat foundation for the MR head portion Q to be formed thereon is formed. The above mentioned inductive head portion P is formed in this manner. In this case, the respective back core sides of the lower magnetic core and the upper magnetic core are magnetically connected to form closed magnetic circuits.

Meanwhile, as material of the lower magnetic core 3 and the upper magnetic core 9, instead of Fe—Ru—Ga—Si alloy, it is permissible to use amorphous alloy comprising one or more elements of Fe, Ni, Co and one or more elements of P, C, B, and Si, or metal-metalloid base amorphous alloy containing Al, Ge, Be, Sn, In, Mo, W, Ti, Mn, Cr, Zr, Hf, Nb, etc. with these elements as main component, or metal-metalloid base amorphous alloy mainly composed of transition element such as Co, Hf, Zr or rare earth elements.

On the other hand, the MR head portion Q is a so-called lateral type MR head in which sense current flows into the MR element 11 in the direction of track width and in substantially parallel direction of the track. Concretely, on the upper magnetic core 9 simultaneously serving as the lower magnetic layer, an insulation layer 10 made of $Al_2O_3$ or $SiO_2$, or the like forming the magnetic gap for reproduction is formed. On this insulation layer 10, the MR element 11 made of Fi—Fe, or the like is disposed so that its long side direction is substantially parallel to its magnetic recording medium facing face (magnetic recording medium running face a) and one end along the long side direction is exposed to the magnetic recording medium running face a. Further, on the MR element 11, a bias conductor 12 made of Cr/Ta or the like for applying bias magnetic field to the MR element is disposed and formed in the same shape as the MR element 11.

On the bias conductor 12, a pair of leading electrodes for supplying bias current to the bias conductor 12 and for supplying sense current to the MR element 11, not shown here are disposed. Then, MR element 11 area held by these leading electrodes act as an effective magnetic sensitive portion indicating magnetic resistance effect.

On the MR element 11 and the above mentioned leading electrodes, an insulation layer 22 made of $Al_2O_3$ or $SiO_2$ or the like is formed. On this insulation layer 22, the upper magnetic layer 13 is bonded by means of adhesive agent such as epoxy resin. The above mentioned MR head portion Q is composed in such a manner.

Next, the production method of the above complex type thin film magnetic head will be described below. The inductive head portion P is produced successively through a process in which the lower magnetic core 3 made of soft magnetic material is formed on the substrate 1 made of non-magnetic material and then the recess portion 3a is formed on the top face 3, a process in which the conductive coil 4 in the shape of spiral is formed on the recess portion 3a through the first flattening layer 23 made of insulation material, and a process in which the upper magnetic core 9 made of soft magnetic material is formed on the conductive coil 4 through the second flattening layer 6 made of insulation material. After that, the MR head portion Q is formed successively through a process in which the MR element 1 is formed on the above mentioned magnetic core 9 simultaneously serving as the lower magnetic layer through the insulation layer 10 and a process in which the upper magnetic layer 13 is formed on the MR element 11 through the insulation layer 22.

Figure 2:
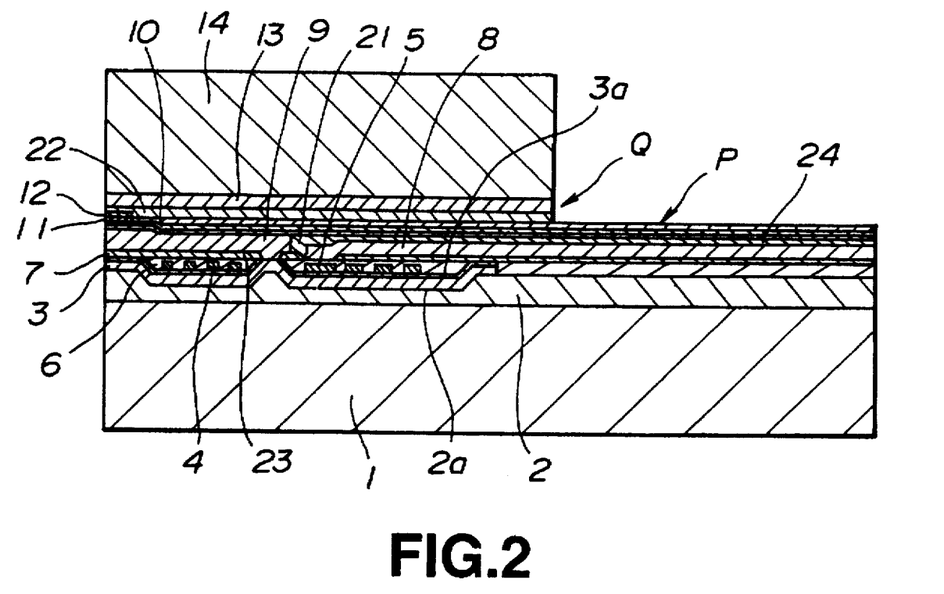
FIG. 2 is a vertical sectional view showing schematically the complex type thin film magnetic head according to the first embodiment of the present invention.

Concretely, as shown in FIG. 2, the insulation layer 2 made of $Al_2O_3$ is formed on the base substrate 1 made of non-magnetic material such as $Al_2O_3$-TiC or the like by high rate bias sputtering or the like.

After that, to obtain a smooth or and accurate profile of the base substrate 1, the base substrate 1 is heat treated at temperatures higher than a temperature in which the Fe—Ru—Ga—Si alloy which is the material of the lower magnetic core 3 to be formed on the insulation layer 2 obtains soft magnetic property, that is, 570° C. in the vacuum in this case. This heat treatment temperature shall be higher than a temperature necessary for a metallic magnetic film to obtain soft magnetic property when the lower magnetic core 3 is made of metallic magnetic film other than the Fe—Ru—Ga—Si alloy.

Then, to flatten the surface of the insulation layer 2, the insulation layer 2 is subject to diamond polishing and buffing. Here, the diamond polishing refers to polishing with a float produced by coating diamond grains using low-hardness metal such as tin and copper or the like. Buffing refers to polishing with a smooth surface plate generally called buff cloth or pad, using alkali Si coated grains as abrasive material. After that, photo resist is coated on the top surface of the polished insulation layer 2 and a specified resist pattern is formed by means of photo lithography technology. Then, the groove portion 2a for placing the conductive coil 4 is formed by etching by ion milling according to this resist pattern and the above resist pattern is removed.

Figure 3:
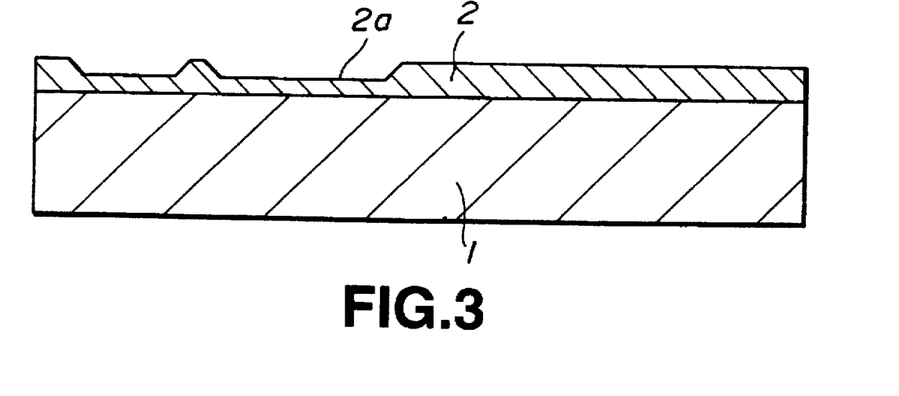
FIG. 3 is a vertical sectional view showing schematically a state in which the insulation layer is formed on the base substrate.
Figure 4:
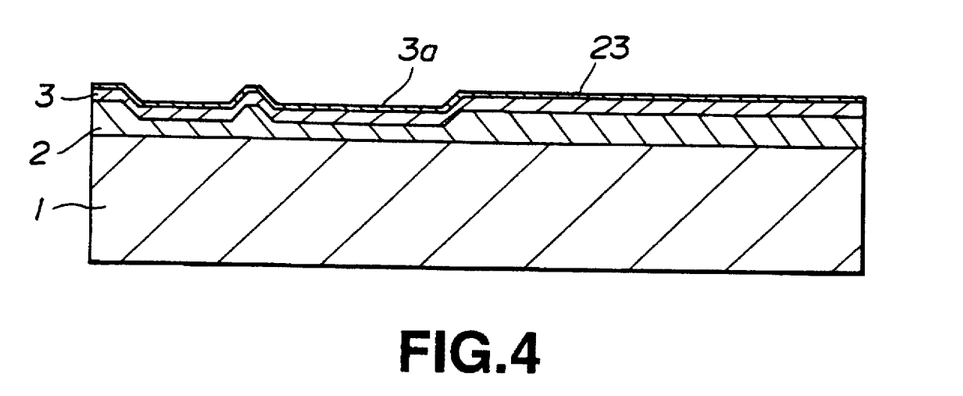
FIG. 4 is a vertical sectional view showing schematically a state in which the lower magnetic core is formed on the insulation layer.

Then, as shown in FIG. 3, the lower magnetic core 3 which is metallic magnetic film made of Fe—Ru—Ga—Si alloy is formed on the insulation layer 2. In this case, by RF magnetron sputter, sputtering is achieved using a target having a composition of Fe81-Ru4-Ga12-Si3 (atomic %) and etching is conducted by iron milling like in the case of the groove portion 2a. In this case, to form the film on the tapered shape of the groove portion 2a as well, fixed continuous sputtering is achieved just above the target.

Assuming that the composition of the formed metallic magnetic film is $(Fe_a—Ru_b—Ga_c—Si_d)_x\ N_yO_zC_w$ (where a, b, c, d, x, y, z indicate atomic percentage of each element), it is preferable to use a target having such a composition that $68 \leq a \leq 90$, $0.1 \leq b \leq 10$, $0.1 \leq c \leq 15$, $10 \leq d \leq 25$, $80 \leq x \leq 100$, $0 \leq y \leq 20$, $0 \leq z \leq 20$, $0 \leq w \leq 20$, $a+b+c+d=100$, $x+y+z+w=100$.

To flatten the bottom surface and secure insulation between the conductive coil 4 and the lower magnetic core 3 when the conductive coil 4 is formed, coil bottom layer made of Ti/Cu not shown is formed after the first bottom layer 23 made of $Al_2O_3$ is continuously formed.

Figure 5:
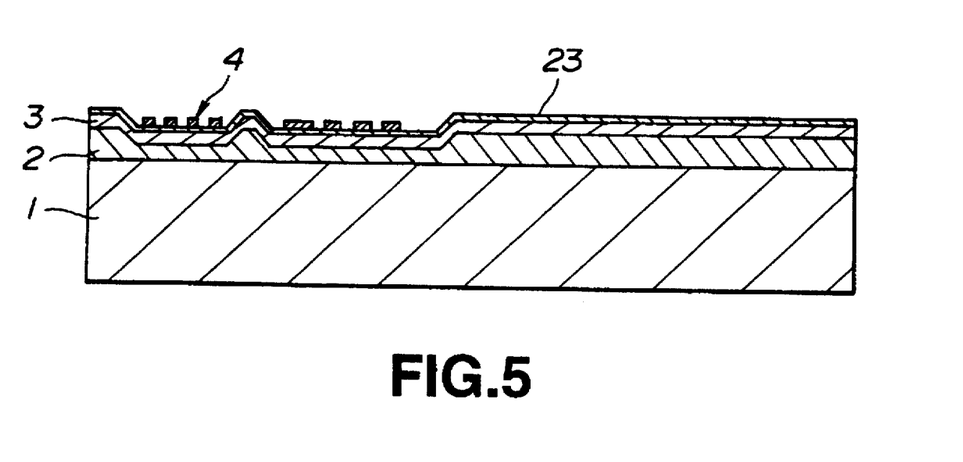
FIG. 5 is a vertical sectional view showing schematically a state in which the conductive coil is formed on the coil bottom layer.
Figure 6:
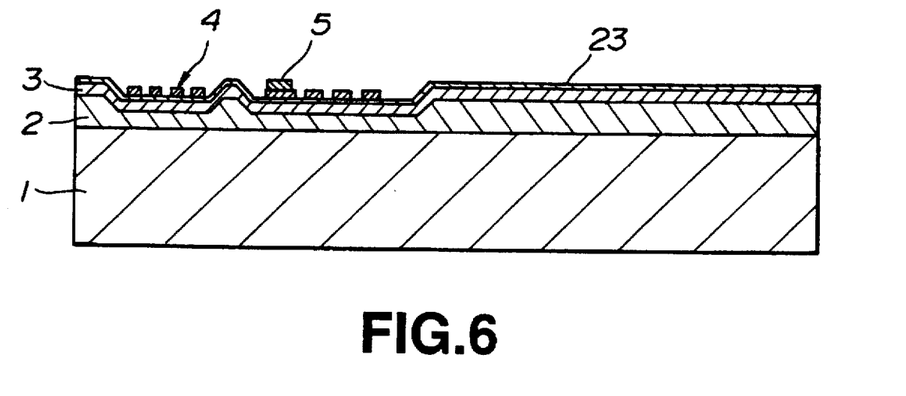
FIG. 6 is a vertical sectional view showing schematically a state in which a connection terminal is formed on the conductive coil.

As shown in FIGS. 5 and 6, the conductive coils 4 made of Cu are formed on the above coil bottom film. In this case, photo resist is coated on the surface of the plating bottom film and a specified resist pattern is formed by photo lithography technology. According to this resist pattern, the conductive coil 4 and the connection terminal 5 are formed by plating using copper sulfate plating fluid easy to control, and then the resist pattern is peeled and at the same time, the plating bottom film is removed by ion milling. At this time, to prevent occurrence of void which may be generated because the $Al_2O_3$ film is formed as the first bottom layer 23, the aspect ratio between the coil height and the space of the conductive coil 4 shall be 1 or more.

Figure 7:
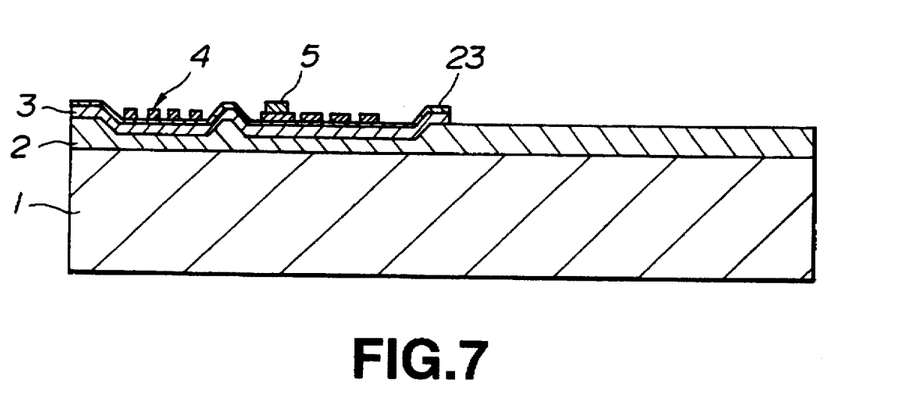
FIG. 7 is a vertical sectional view showing schematically a state in which the rear ends of the lower magnetic core and a first bottom layer are removed.
Figure 8:
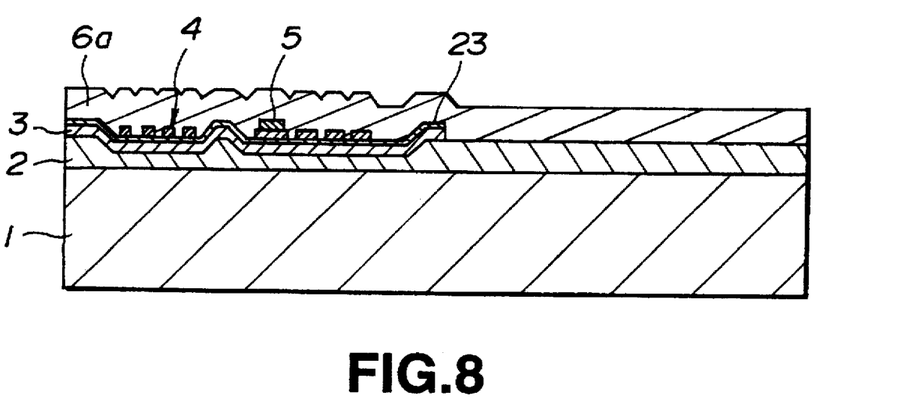
FIG. 8 is a vertical sectional view showing schematically a state in which a second flattening layer is formed.

Then, as shown in FIG. 7, the rear end portions of the lower magnetic core 3 and the first bottom layer 23 are removed. As shown in FIG. 8, $Al_2O_3$ film 6a is formed on the overall surface thereof by high rate bias sputtering and this film is polished until the front core side, back core side and connection terminal 5 of the bottom magnetic core 3 are exposed, to achieve the second flattening layer 6.

Figure 9:
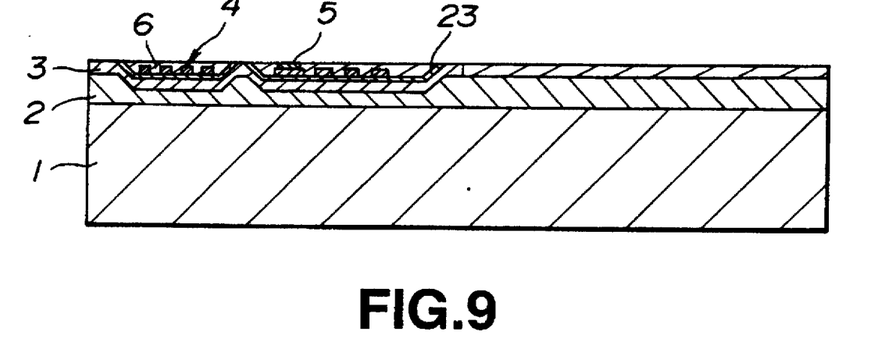
FIG. 9 is a vertical sectional view showing schematically a state in which a gap film is formed.
Figure 10:
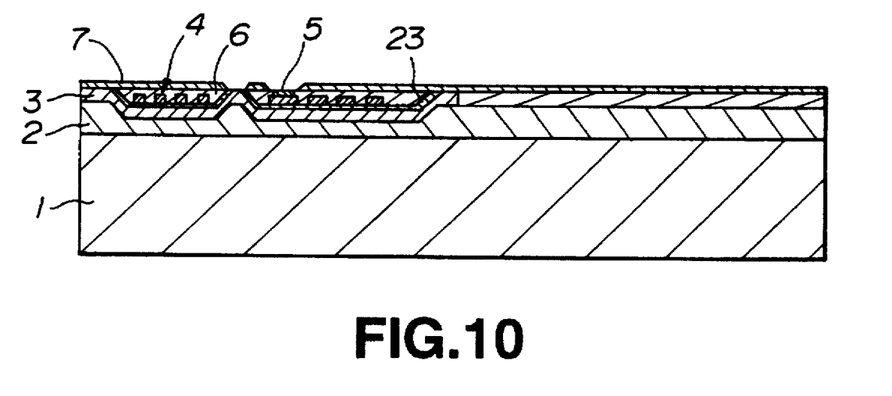
FIG. 10 is a vertical sectional view showing schematically a state in which etching is performed on the gap film.

After that, as shown in FIG. 9, the gap film 7 for forming magnetic gap for recording is formed on the overall surface thereof and photo resist is coated and a specified resist pattern is formed by photo lithography technology. According to this resist pattern, etching of the back gap is conducted to expose the back core side of the lower magnetic core 3 and the connection terminal 5 as shown in FIG. 10.

Figure 11:
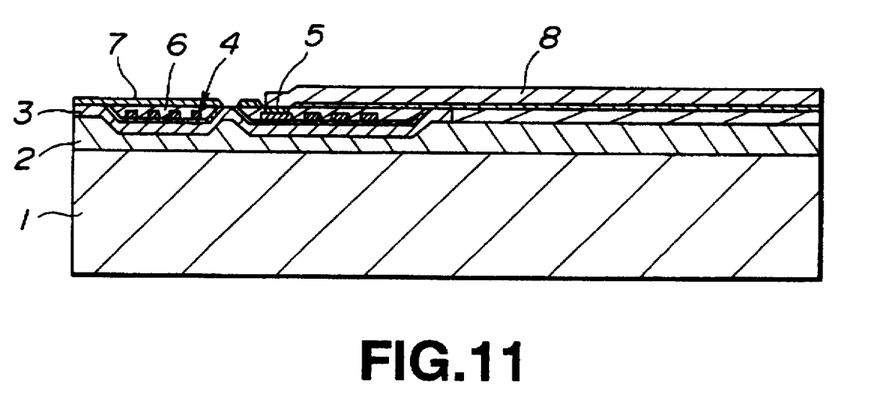
FIG. 11 is a vertical sectional view showing schematically a state in which a leading electrode is electrically connected to the connection terminal.

Then, as shown in FIG. 11, a leading electrode 8 of the conductive coil 4 is formed and electrically connected with the connection terminal 5. In this case, plating bottom film is formed on the surface of the gap film 7 and after that, photo resist is coated and a specified resist pattern is formed by photo lithography technology. According to resist pattern, plating film is formed and the resist pattern is peeled and at the same time, the plating bottom film is removed by ion milling.

Figure 12:
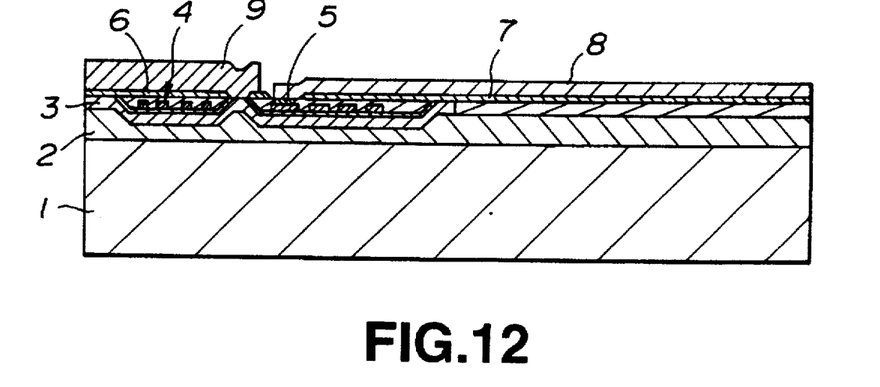
FIG. 12 is a vertical sectional view showing schematically a state in which the upper magnetic core is formed on the gap film.
Figure 13:
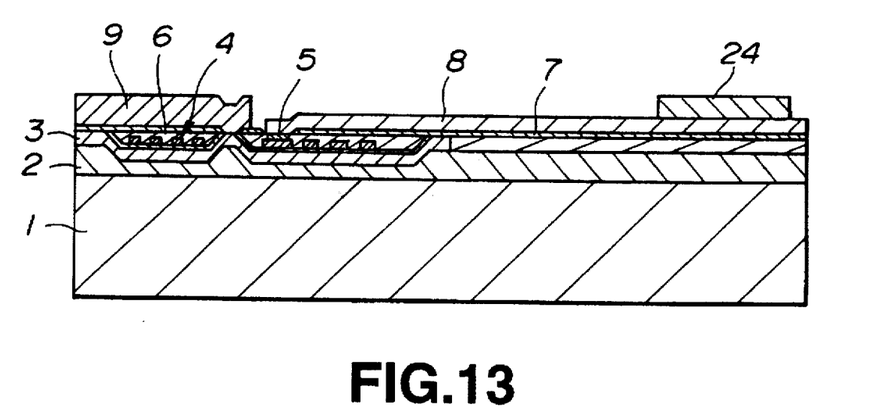
FIG. 13 is a vertical sectional view showing schematically a state in which a terminal to be connected to a flexible cable is formed.

As shown in FIG. 12, the upper magnetic core 9 which is metallic magnetic film made of Fe—Ru—Ga—Si alloy is formed on the gap film 7. In this case, by RF magnetron sputter using a target having the composition of Fe81-Ru4-Ga12-Si3 (atomic %), sputtering is performed and etching is performed by ion milling so as to connect the upper magnetic core 9 with the back core side of the lower magnetic core 3, so that the upper magnetic core 9 in which a closed magnetic circuit is formed, is formed. In this case, unlike a case in which the lower magnetic core 3 is formed, rotational sputtering is performed just above the target. Next, as shown in FIG. 13, a terminal 24 to be connected to flexible cable is formed by plating using copper sulfate plating fluid like the case in which the conductive coil 4 is formed.

Then, the upper magnetic core 9 is heat treated at a temperature or higher than a temperature in which the Fe—Ru—Ga—Si alloy which is material of the upper magnetic core 9 gains soft magnetic property, that is, 550° C. in the vacuum.

Figure 14:
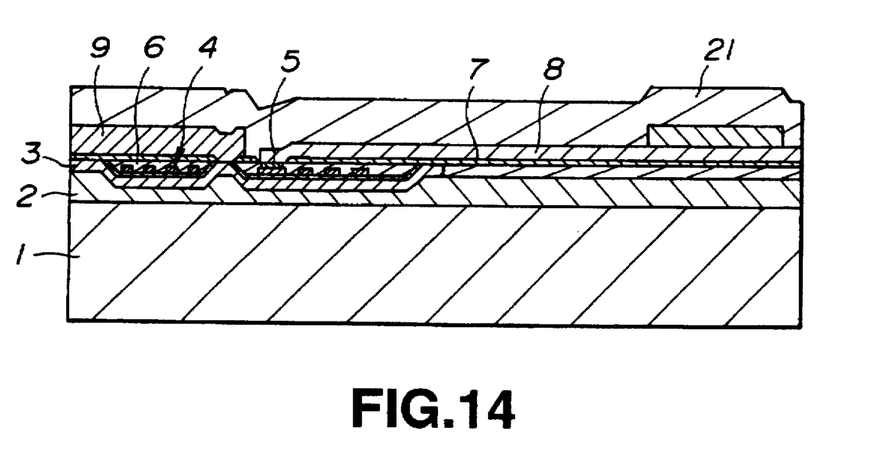
FIG. 14 is a vertical sectional view showing schematically a state in which the bottom layer is formed.
Figure 15:
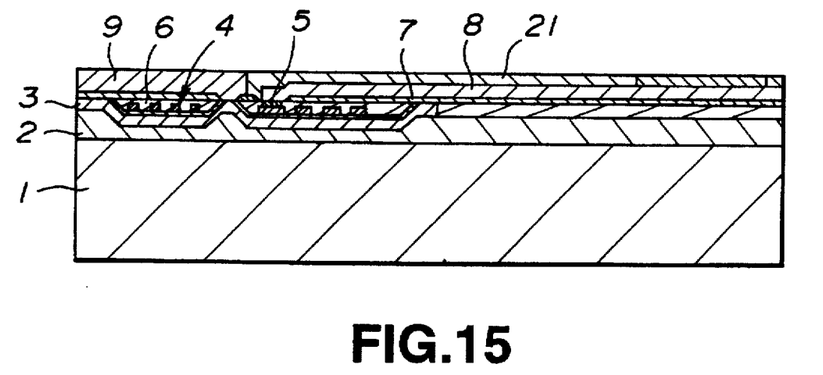
FIG. 15 is a vertical sectional view showing schematically a state in which the top surfaces of the upper magnetic core and the bottom layer are flattened.

As shown in FIG. 14, the foundation layer 21 made of $Al_2O_3$ is formed on the overall surface from the upper magnetic core 9 to the terminal 24 by means of high rate bias sputtering or the like. As shown in FIG. 15, diamond polishing and buffing are performed to flatten the top surfaces of the upper magnetic core 9 and the foundation layer 21. As a result, the inductive head portion P is completed.

Figure 16:
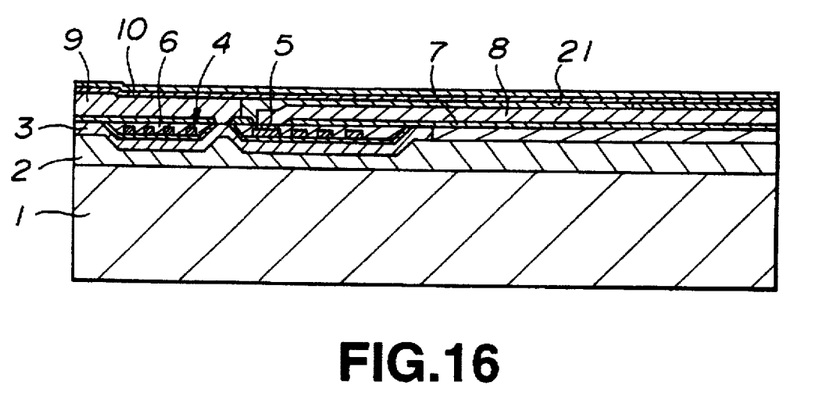
FIG. 16 is a vertical sectional view showing schematically a state in which etching is performed on the top surface of the upper magnetic core to form the leading electrode.

Then, as shown in FIG. 16, the top surface of the upper magnetic core 9 is subject to etching by means of an ion etching apparatus to form a pair of leading electrodes of the MR element 11.

Figure 17:
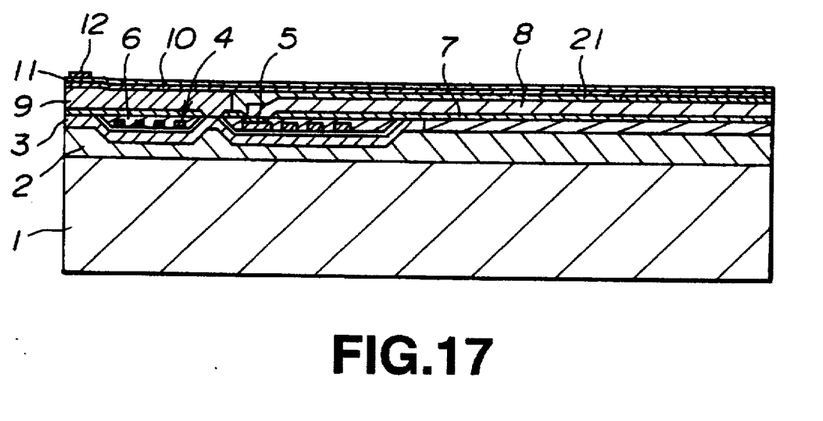
FIG. 17 is a vertical sectional view showing schematically a state in which the MR element and a bias conductor are formed.

After that, the insulation layer 10 made of $Al_2O_3$ or $SiO_2$ is formed on the top surfaces of the upper magnetic core 9 and the foundation layer 21. On this insulation layer 10, Ni—Fe film and Cr/Ta film are successively formed successively by sputtering. As shown in FIG. 17, photo resist is coated on the Ni—Fe film and the Cr/Ta film and a specified resist pattern is made by lithography technology. The photo resist is subject to etching by ion milling according to this resist pattern to form the MR element 11 and the bias conductor 12.

Next, after a pair of leading electrodes to be connected to both ends of the MR element 11 are formed by lift-off method, the insulation layer 22 made of $Al_2O_3$ or $SiO_2$ or the like is formed on the MR element 11 and the above mentioned leading electrodes.

Then, the upper magnetic layer 13 is bonded to the top of this insulation layer 22 by means of adhesive agent such as epoxy resin or the like. Then, the MR head portion Q is completed. Further, the protective plate 14 made of non-magnetic material is formed on the upper magnetic layer 13. The above complex type thin film magnetic head is completed.

In the complex type thin film magnetic head according to the first embodiment, because the MR head portion Q is formed on the inductive head portion P, even if in the process for producing the inductive head portion P, the heating temperature of heat treatment to be conducted to obtain soft magnetic properties of the lower magnetic core 3 and the upper magnetic core 9, is higher than deterioration temperature of the MR element 11, the MR element 11 is never affected. Therefore, it is possible to provide the lower magnetic core 3 and the upper magnetic core 9 made of metallic magnetic film having high magnetic permeability and high saturated magnetic flux density, without heat deteriorating the MR element 11.

Further, because the recess portion 3a exists on the top surface of the lower magnetic core 3 and the conductive coil 4 is formed on the recess portion 3a in the state that it is embedded in the recess portion 3a, it is possible to reduce the volume of the upper magnetic core 9 when the upper magnetic core is formed. Further, the bottom surface of the MR head portion Q can be flattened easily thereby suppressing deterioration of magnetic property.

Here, an experimental example will be explained. In this experiment, frictional property of metallic film of the Fe—Ru—Ga—Si alloy which is material of the above mentioned lower magnetic core 3 and the upper magnetic core 9 was investigated based on a comparison with metallic magnetic film made of Parmalloy (Ni—Fe) plating film which is material of a conventional lower magnetic core and upper magnetic core.

Concretely, in this experiment, metallic magnetic film (sample 1) formed using a target made of Fe—Ru—Ga—Si alloy and metallic magnetic film (sample 2) formed using a target made of Ni—Fe alloy were used. A Knoop indentation mark is formed on each sample and theft specific frictional amount against a magnetic tape was compared between the respective unit samples.

Figure 18:
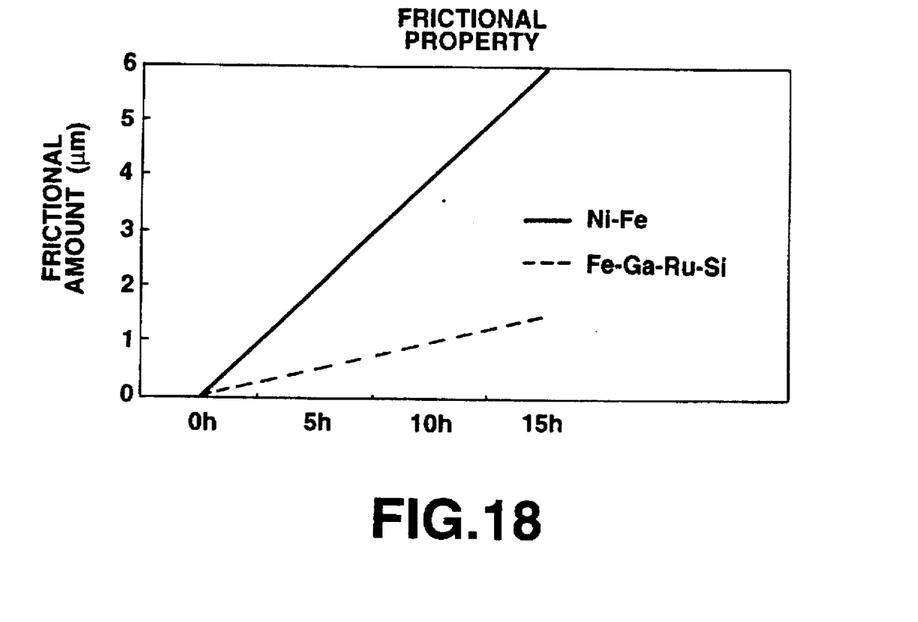
FIG. 18 is a characteristic diagram showing a difference of specific frictional amount against the magnetic tape between the metallic magnetic film made of Fe—Ru—Ga—Si alloy and metallic magnetic film made of Ni—Fe alloy.

As a result, as shown in FIG. 18, there was an evident difference between the frictional properties of the both. As compared to the sample 2, the sample 1 indicated more excellent frictional property.

As mentioned above, in the complex type thin film magnetic head according to a structure of the first embodiment, even if metallic magnetic film having high magnetic permeability and high saturated magnetic flux density is used for the lower magnetic core and the upper magnetic core, their frictional properties are never lost.

Then, a complex type thin film magnetic head according to a second embodiment will be described below. Although this complex type thin film magnetic head has substantially the same structure as that of the first embodiment, there is a difference in that the materials of the base substrate 1 and the protective plate are different. Meanwhile, for part members corresponding to the complex type thin film magnetic head according to the first embodiment, the same signs are attached and explanation thereof is omitted.

That is, in the complex type thin film magnetic head according to the second embodiment, the base substrate 1 and the protective plate 14 are made of the material in which CaO, $TiO_2$ and NiO are the main components while mixing ratio between CaO and $TiO_2$ is 30/70–50/50 and the content of NiO is 5–30 mol %.

Here, some experimental examples will be described. First, as the experiment 1, of CaO, $TiO_2$ and NiO which are main components of non-magnetic materials composing the base substrate 1 and the protective plate 14, NiO was changed from to 80 mol % with the mixing ratio (mole ratio) between CaO and $TiO_2$ being set to a specified value of 45/55. Under this condition, changes of frictional amount (changes of protrusion amount) of the non-magnetic material plate and changes of eccentric frictional amount between the non-magnetic material plate and the metallic magnetic film made of Fe—Ru—Ga—Si alloy were investigated.

Figure 19:
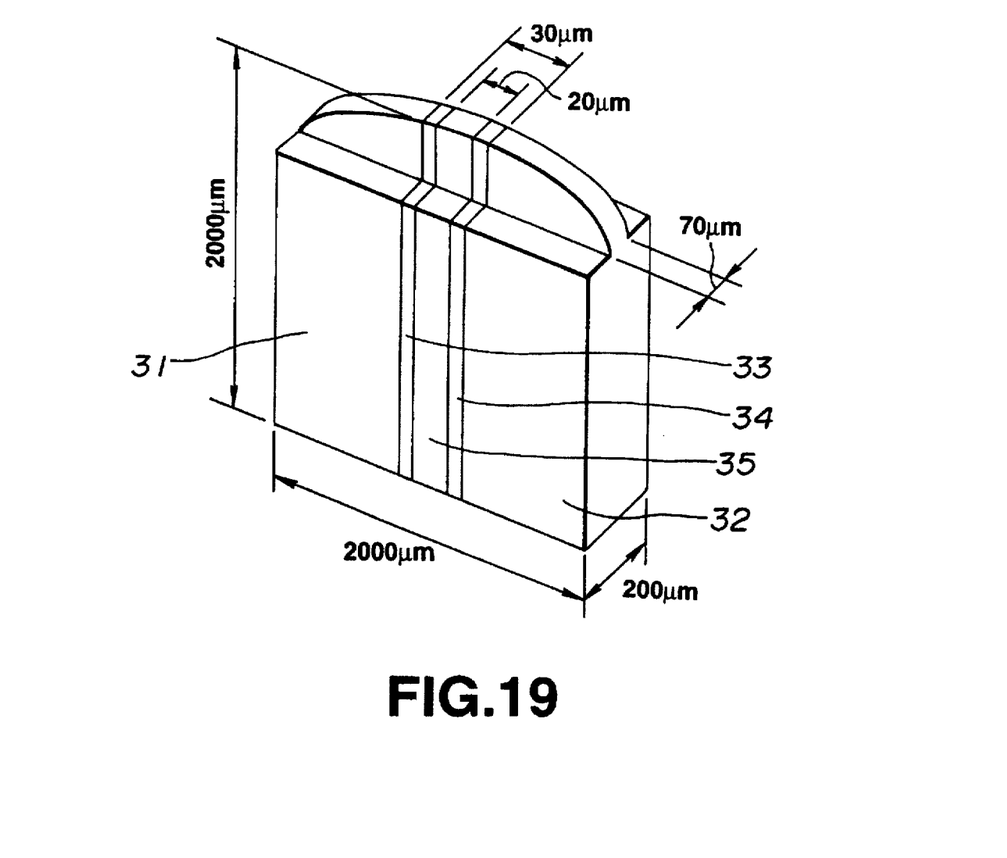
FIG. 19 is a perspective view showing schematically an experimental dummy head.

Here, an experimental dummy head as shown in FIG. 19 was used and mounted on a specified rotation drum. On both sides of this dummy head, a pair of non-magnetic material plates 31, 32 are disposed and a metallic magnetic film 35 made of Fe—Ru—Ga—Si alloy is disposed between a pair of these non-magnetic material plates 31, 32 through insulation films 33, 34. This non-magnetic material plates 31, 32 are made of material in which their main components are CaO, $TiO_2$ and NiO and with the mixing ratio between CaO and $TiO_2$ being fixed to a specified value of 45/55, NiO is changed from 0 to 80 mol %. The above dummy head is 2 mm (width)×2 mm (height)×0.2 mm (thickness), and the thickness of the metallic magnetic film is 20 μm, the thickness of the insulation films 33, 34 is respectively 5 μm, the contact width is 70 μm and the radius of curvature of the end portion is 5 mm.

Using two kinds of magnetic tapes (tape A, tape B) as a magnetic recording medium, these magnetic tapes were made to slide along the above mentioned dummy head for 300 hours under the environment in which the temperature was 30° C. and the humidity was 80%.

Generally, eccentric friction which may occur on the magnetic recording medium running face of a magnetic head induces separation loss. This separation loss L can be substantially represented according to an expression shown below.

L=54.6d/λ (dB)

where d is separation distance (which corresponds to eccentric frictional amount) between the magnetic recording medium and the magnetic recording medium running face. λ is recording wave length. This expression indicates that the larger eccentric frictional amount becomes, the more output drops particularly in short wave length region (high frequency region).

Figure 20:
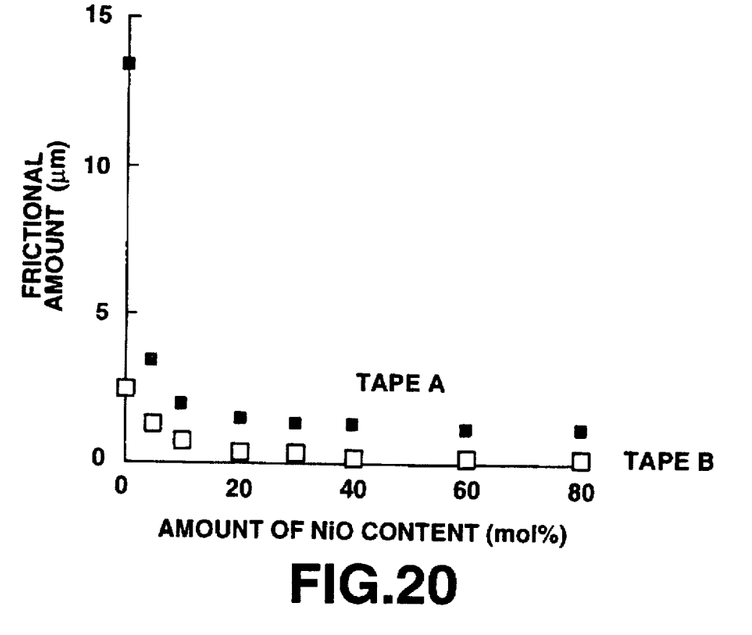
FIG. 20 is a characteristic diagram showing changes of frictional amount of the non-magnetic material plate with changes of the content of NiO.
Figure 21:
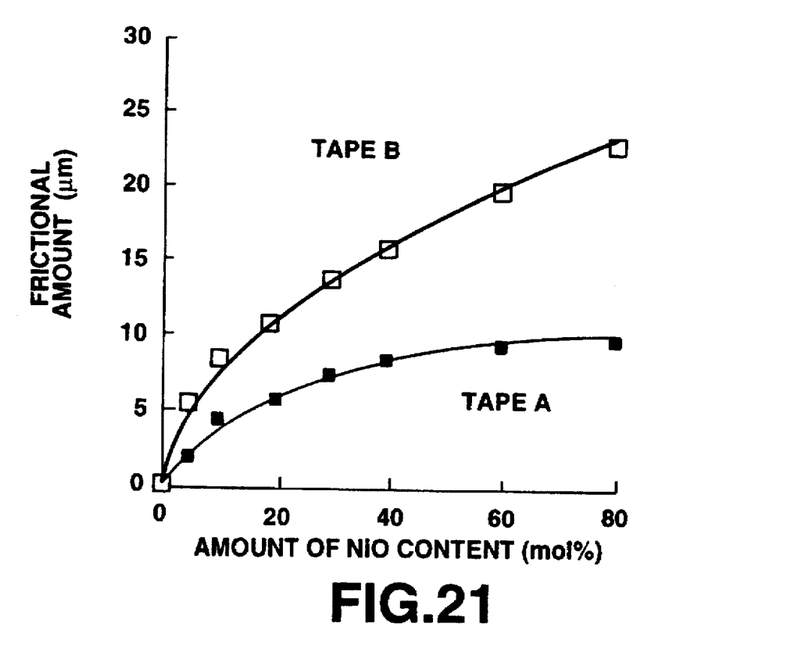
FIG. 21 is a characteristic diagram showing changes of eccentric frictional amounts of the non-magnetic material plate and metallic magnetic film with changes of the content of NiO.

As regards a result of the experiment 1, FIG. 19 shows changes of the frictional amount of the non-magnetic material plates 31, 32 with changes of the content of NiO. FIG. 20 shows changes of the eccentric frictional amount of the metallic magnetic films 33, 34 with changes of the content of NiO.

The eccentric frictional amount is desired to be less than 15 nm. If the frictional amount is large, the service life of the magnetic head decreases. Therefore, the higher frictional resistance, it is better. By synthetic evaluation taking into account a balance between the eccentric frictional amount and the frictional amount, it is made evident that a composition in which the content of NiO is 5–30 mol % is the most preferable.

Then, the experiment 2 will be described below. In this experiment 2, of CaO, TiO$_2$ and NiO which are main components of the non-magnetic material composing the base substrate 1 and the protective plate 14, mixing ratio (mole ratio) between CaO and TiO$_2$ was changed to 10/90, 20/80, 30/70, 40/60, 45/55, 50/50, and 55/45 with the content of NiO being fixed to a specified value of 10 mol %. Then, the thermal expansion coefficient and pore ratio of the above mentioned non-magnetic material were investigated.

Table 1 shows a result of the experiment 2 below.

TABLE 1

| | NiO:10 mol % | | | | | | |
|---|---|---|---|---|---|---|---|
| CaO/ TiO$_2$ mole ratio | 10/90 | 20/80 | 30/70 | 40/60 | 45/55 | 50/50 | 55/45 |
| thermal expansion coefficient | 95 | 100 | 104 | 107 | 114 | 121 | |
| pore ratio | <0.1% | <0.1% | <0.1% | <0.1% | <0.1% | <0.1% | >30% |

As evident from Table 1, if the mixing ratio of CaO relative to TiO$_2$ is lower than 30/70, the separating amount of TiO$_2$ is large. And the thermal expansion efficient decreases to less than 100×10$^{-7}$ so that matching with the respective magnetic layers is deteriorated. On the other hand, if the mixing ratio between CaO and TiO$_2$ is higher than 50/50, CaO is separated so that sintering property is remarkably deteriorated, therefore it is difficult to achieve denseness. Thus, it can be said that the mixing ratio between CaO and TiO$_2$ is preferable to be 30/70–50/50.

In the complex type thin film magnetic head according to the structure of the second embodiment, because the MR head portion Q is formed on the inductive head portion P like in the structure of the second embodiment, even if heating temperature of heat treatment to be conducted to obtain soft magnetic property of the lower magnetic core 3 and the upper magnetic core 9 is higher than the deterioration temperature of the MR element 11 in a process in which the inductive head portion p is produced, the MR element 11 is never affected. Therefore, it is possible to provide the lower magnetic core 3 and the upper magnetic core 9 made of metallic magnetic film having high magnetic permeability and high saturated magnetic flux density without deteriorating the MR element 11 by heat.

Further, because the recess portion 3a exists on the top surface of the lower magnetic core 3 and the conductive coil 4 is formed on the recess portion 3a in the state that it is embedded in the recess portion 3a, it is possible to reduce the volume of the upper magnetic core 9 when the upper magnetic core is formed. Further, the bottom surface of the MR head portion Q can be flattened easily thereby suppressing deterioration of magnetic property.

Still further, because the base substrate 1 and the protective plate 14 are composed of non-magnetic material in which CaO, TiO$_2$ and NiO are main components thereof, the mixing ratio between CaO and TiO$_2$ is 30/70–50/50 and the content of NiO is 5–30 mol, the frictional amount produced by repeating slide on a magnetic tape is substantially equalized throughout the magnetic recording medium running face while high frictional resistance is maintained, thereby preventing eccentric friction.

According to the complex type thin film magnetic head of the present invention and the production method thereof, it is possible to achieve high recording magnetic density without deteriorating the MR element by heat at the time of production and relax eccentric friction likely to occur between the lower magnetic core and the upper magnetic core in the case when the complex type thin film magnetic head is of sliding type, thereby largely improving the reliability of the product.

What is claimed:

1. A complex type thin film magnetic head comprising;
   an induced type magnetic head portion containing; a lower magnetic core made of soft magnetic material, having recess portions provided on the top surface of a substrate made of non-magnetic material; conductive coils in the shape of spiral, formed on the recess portions disposed on the lower magnetic core through a flattening layer made of insulation material, said conductive coils being embedded in the recess portions and; a upper magnetic core made of soft magnetic material, formed on said conductive coils through the flattening layer made of insulation material; and a magnetic resistance effect type magnetic head portion containing; magnetic resistance effect elements formed on said upper magnetic core serving as the lower magnetic layer at the same time through an insulation layer and; a upper magnetic layer formed on said magnetic resistance effect element through an insulation layer.

2. A complex type thin film magnetic head according to claim 1 wherein the insulation layer having groove portions thereon is formed between the substrate and the lower magnetic core and the conductive coils are formed on the recess portions formed on the top surface of the lower magnetic core because said groove portions exist in the insulation layer, through the flattening layer.

3. A complex type thin film magnetic head according to claim 1 wherein the lower magnetic core and the upper magnetic core are formed of metallic magnetic film having high magnetic permeability and high saturated magnetic flux density.

4. A complex type thin film magnetic head according to claim 3 wherein the lower magnetic core and the upper magnetic core are formed of metallic magnetic film in which heating temperature of heat treatment conducted to obtain soft magnetic property is higher than the deterioration temperature of the magnetic resistance effect element.

5. A complex type thin film magnetic head according to claim 3 wherein the lower magnetic core and the upper magnetic core are formed of metallic magnetic film made of Fe—Ru—Ga—Si alloy or amorphous alloy.

6. A complex type thin film magnetic head according to claim 1 wherein the substrate is formed of non-magnetic material in which CaO, $TiO_2$, and NiO are its main components, the mixing ratio between CaO and $TiO_2$ is 30/70–50/50 and the amount of the content of NiO is 5–30 mol %.

7. A complex type thin film magnetic head according to claim 1 wherein a protective plate is disposed on the upper magnetic layer and said protective plate is formed of non-magnetic material in which CaO, $TiO_2$, and NiO are its main components, the mixing ratio between CaO and $TiO_2$ is 30/70–50/50 and the amount of the content of NiO is 5–30 mol %.

8. A production method for the complex type thin film magnetic head, in which; the inductive type magnetic head portion is produced successively through a process in which the lower magnetic core made of soft magnetic material, having recess portions on the top surface thereof is formed on the substrate made of non-magnetic material, a process in which the conductive coil in the shape of spiral is formed on said recess portion through the flattening layer made of insulation material, and a process in which the upper magnetic core made of soft magnetic material is formed on said conductive coil through the flattening layer made of insulation material; and thereafter the magnetic resistance effect type magnetic head is produced successively through a process in which the magnetic resistance effect element is formed on said upper magnetic core simultaneously serving as the lower magnetic layer through the insulation layer and a process in which the upper magnetic layer is formed on the magnetic resistance effect element through the insulation layer.

* * * * *